United States Patent [19]  [11] 3,934,650
LaFortune  [45] Jan. 27, 1976

[54] RECOVERY OF NATURAL GAS DURING SOLUTION MINING OF AN UNDERGROUND SALT DEPOSIT

[75] Inventor: Robert G. J. LaFortune, Mentor, Ohio

[73] Assignee: Diamond Shamrock Corporation, Cleveland, Ohio

[22] Filed: Sept. 23, 1974

[21] Appl. No.: 508,253

Related U.S. Application Data

[60] Division of Ser. No. 316,407, Dec. 18, 1972, Pat. No. 3,856,482, which is a continuation of Ser. No. 172,239, Aug. 16, 1971, abandoned.

[52] U.S. Cl............... 166/267; 23/272 AH; 175/66; 299/5
[51] Int. Cl.² .......................................... E21B 43/00
[58] Field of Search ...... 55/36, 45, 527; 23/272 AH; 159/DIG. 31; 166/266, 267; 299/4, 5; 175/66, 206

[56] References Cited
UNITED STATES PATENTS

| 3,012,764 | 12/1961 | Jacoby | 299/4 |
| 3,516,799 | 7/1970 | Dotson | 55/36 |
| 3,527,676 | 9/1970 | Hingst et al. | 159/DIG. 31 |
| 3,606,466 | 9/1971 | Fernandes | 299/5 |
| 3,676,078 | 7/1972 | Jacoby | 299/5 |

Primary Examiner—Frank C. Abbott
Assistant Examiner—Jack E. Ebel
Attorney, Agent, or Firm—John J. Freer

[57] ABSTRACT

Brine coming to the earth's surface can contain substances other than salt in water; occasionally of particular interest is gas contained in the brine, especially natural gas or methane or ethane. As the brine reaches the surface of the earth, the presence of this gas is visibly apparent and gives the brine a cloudy appearance. This gas is typically well dispersed through the brine initially as very minute incipient gas bubbles that will accumulate and separate from the brine, given sufficient time. A method is herein provided for quickly and efficiently clarifying the brine by passing the cloudy brine through a filter zone providing a pressure drop across the zone of greater than about 20 p.s.i.g.

1 Claim, No Drawings

3,934,650

RECOVERY OF NATURAL GAS DURING SOLUTION MINING OF AN UNDERGROUND SALT DEPOSIT

CROSS REFERENCE TO RELATED APPLICATION

This application is a divisional application of U.S. patent application Ser. No. 316,407, now U.S. Pat. No. 3,856,482, filed on Dec. 18, 1972, which application is a continuation application of Ser. No. 172,239, filed on Aug. 16, 1971 and now abandoned.

BACKGROUND OF THE INVENTION

Brine, useful for example in the electrolytic production of chlorine, is typically available from underground salt deposits, and at the earth's surface may be in cloudy condition owing to gas bubbles. These are generally contributed to the brine from natural gas contained within the salt deposit. Since at the surface of the earth the brine is clouded by the gas, i.e., bubbles have already formed, it has heretofore been possible to simply expose the cloudy brine, such as in an open tank for a time sufficient to permit coalescing of the bubbles followed by bubble accumulation and eventual slow separation of gas from brine.

It has been disclosed in U.S. Pat. Nos. 3,516,799 that liquids can be degassed in apparatus containing one or more glass filters, typically gls wool, disposed across a vessel through which the liquid passes. Such apparatus is ostensibly of particular interest where it operates to disrupt the gas-liquid equilibrium, thereby forming gas bubbles at the filter zone, followed by subsequent separation of gas from liquid. It has, however, been unexpectedly found that an application, wherein the filter medium is supplied by materials such as raw glass wool or woven glass fiber, of such apparatus to cloudy brine, i.e. a liquid wherein the gas has formed incipient bubbles rather than being at least substantially dissolved in the liquid, operates only to further disperse such incipient, finely-divided gas bubbles, thereby providing a cloudy brine at both the inlet and outlet regions of the filter zone.

SUMMARY OF THE INVENTION

The chief drawback to the former approach of simple atmospheric exposure for separation of gas from brine has been the lengthy extent of the exposure of the brine needed prior to separation. It has now been found that brine can be easily and expediently clarified. Moreover, the method herein used for clarification readily lends itself to collection for eventual storage of the gas separated from the liquid brine. The present process is easy and economical to operate and is serviceable for extended periods of time prior to equipment replacement.

Broadly, this invention is directed to a method of clarifying brine clouded by very finely divided and substantially uniformly dispersed incipient gas bubbles which method comprises passing the clouded brine through a fibrous filter element disposed within a filter zone, said element having a fiber density sufficient to provide a pressure drop for said brine across said filter element of not substantially below about 20 p.s.i.g., withdrawing clarified, gas-depleted brine from the downstream region of said filter zone, and permitting passage of gas from said filter zone away from the resulting clarified brine.

Additionally, the invention is directed to the method for collecting natural gas from aqueous media and to the method of acquiring and collecting natural gas contained in subterranean salt deposits susceptible to the extraction of salt as brine.

DESCRIPTION OF THE PREFERRED EMBODIMENTS

Brine is typically available as a natural brine or as an artificial brine, the latter referring to an aqueous salt solution that is obtained from a subterranean salt deposit by injection of water into the deposit followed by dissolution of the subterranean salt in the water, whereby the water returning to the earth's surface carries the dissolved salt therein. This brine for commercial purposes is typically used for its salt content, such as in the electrolytic production of chlorine. Gas is considered as a contaminant, requiring the separation of gas from the liquid medium prior to the use of the brine or of salt that may be derived therefrom.

In the filter zone the element should have a fiber density sufficient to provide a pressure drop of the brine across the filter element of not substantially below about 20 p.s.i.g. A pressure drop of less than above 20 p.s.i.g. may not provide for continuous, complete elimination of the finely divided gas bubbles from the cloudy brine entering the filter element. Preferably, for most continuous and efficient clarification of the brine, the filter element provides a pressure drop of between 25-50 p.s.i.g. It is also advantageous that the brine flowing away from the filter element be at a pressure that is substantially atmospheric pressure, e.g., from modestly subatmospheric pressure up to about 5-10 p.s.i.g. Advantageously to provide for most efficient filtration and commensurate brine clarification, the brine dischaging from the filter element is at a pressure of about 2-3 p.s.i.g. or less.

It has been found that enhanced filtration is provided by a filter element wherein the upstream surface area, i.e., the area where the brine enters the element, is larger than the downstream surface area from which the brine discharges. Such filter elements can, for example, be wedge or pie shaped in cross section to provide such differential in surface area but filter elements of particular interest, and providing such differential, are cylindrical elements. In the cylindrical elements the brine enters around the outside surface of the element and flows through the element into a hollow core region and then away from the element typically through the hollow core. Such filter elements as provide an upstream surface area that is larger than the downstream surface area preferably, for enhanced brine clarification, have a ratio of upstream surface area to downstream surface area of about 2:1 or more for most efficient clarification.

Such elements, including those that provide a cross section differential, can have pore size at the upstream surface area of the filter element that is larger than the pore size of the element at the downstream surface from which the clarified brine is discharged. This feature of a filtering element has been found to be quite serviceable and it is preferred that the elements provide such a difference in pore size for the most efficient separation of gas from the brine. It is further most advantageous that the filter zone have a fiber density at least at the downstream region of the filter element so that at the first instant of flow of the cloudy brine through the filter, such downstream region provides a pore size of not substantially above about 100 microns. Extended filtration, as well as most efficient separation of gas from brine is provided by filter elements having a fiber density at the downstream region of the filter element providing a pore size not substantially above about 50 microns, and such filter elements are thus preferred. The fibers for such element may be either natural or synthetic, or both and serviceable fibers are exemplified by wool, cellulose, and rayon.

Filtering elements of particular interest are those wherein the fibers are bound with a resin into a dense filtration element. The resin can be impregnated into the fibers and polymerized therein resulting in a material that may be useful without additional need for significant structural reinforcement. For impregnation and subsequent polymerization, these resins include melamine and phenolic resins.

Such filter elements having augmented structural integrity through resin impregnation and polymerization may be useful at elevated pressures, e.g., at a pressure above about 60–70 p.s.i.g., and such elevated pressures may be useful for purposes of this invention. Typically, however, the brine entering the filter element is at a maximum pressure approaching about 40–60 p.s.i.g.

In typical operation, a brine feeding from a bore hole is at a temperature of about 65°F. and contains 78 volume percent water, about 17 volume percent dissolved salt, and the balance virtually all gas. Such a brine upon inspection has a cloudy appearance owing to uniformly dispersed incipient gas bubbles. Upon feeding to a tank and retention therein, such brine, in batch processing, will be clarified, from mere atmospheric exposure and escape of gas overhead of the liquid if the retention time is of sufficient duration.

A filter zone is prepared with a bundle of 264 filter elements each of which has cellulose fibers impregnated with melamine resin and providing a structurally rigid filter element that is cylindrical in shape and has a hollow core. More particularly, each element has a height of 9.75 inches, an outside diameter of 2.75 inches and an inside diameter of one inch and has a fiber density providing a 50 micron pore size at the first instant flow on the inside surface of the filter.

In continuous operation, the above-described brine circulates around the outside surface of such filter elements at a pressure of about 30 p.s.i.g., and passes through each element. The brine circulating around the outside of the filter element has a uniform, very cloudy appearance that is readily visible with the unaided eye. From the hollow central zone of the filter element clarified, gas-depleted brine is withdrawn and overhead from such element natural gas is removed. The removed clarified brine flows out of the filtration zone at atmospheric pressure and the total flow of brine through each element is at a rate that varies in continuous operation between about 3–4.5 gallons per minute, although much greater rates would be operational. Each element can be run continuously for about 8 months or longer prior to removal of the element, at which time some visual filter plugging is noted, although on reuse, continuous, highly desirable brine clarification may continue. By operation with such bundle of filter elements, brine clarification is achieved on the order of forty times faster than with clarification achieved through mere exposure of the cloudy brine to the atmosphere.

I claim:

1. The method of recovering natural gas contained in an underground salt deposit, which method comprises:
   A. injecting water into said underground salt deposit and contacting the gas-containing salt deposit with injected water, thus obtaining a gas-containing brine solution;
   B. withdrawing said brine solution from the underground salt deposit thereby forming brine clouded by very finely divided and substantially uniformly dispersed incipient gas bubbles;
   C. passing the clouded brine through a fibrous filter element disposed within a filter zone, said element having a fiber density sufficient to provide a pressure drop for said brine across said filter element of not substantially below about 20 p.s.i.g., and containing in the element natural and synthetic fibers maintained in said filter zone at least in part by resin binding, wherein said fibers are selected from the group consisting of natural wool, cellulose, and rayon, and said fibers are bound together by a synthetic, water-insoluble resin;
   D. withdrawing clarified, gas-depleted brine from the downstream region of said filter zone;
   E. withdrawing gas from said filter zone and away from the resulting clarified brine; and,
   F. collecting said gas overhead from said filter zone.

* * * * *